June 20, 1961  I. ROSENBLOOM  2,988,823
TRANSPARENT ANATOMICAL MODEL
Filed Aug. 12, 1959  3 Sheets-Sheet 2

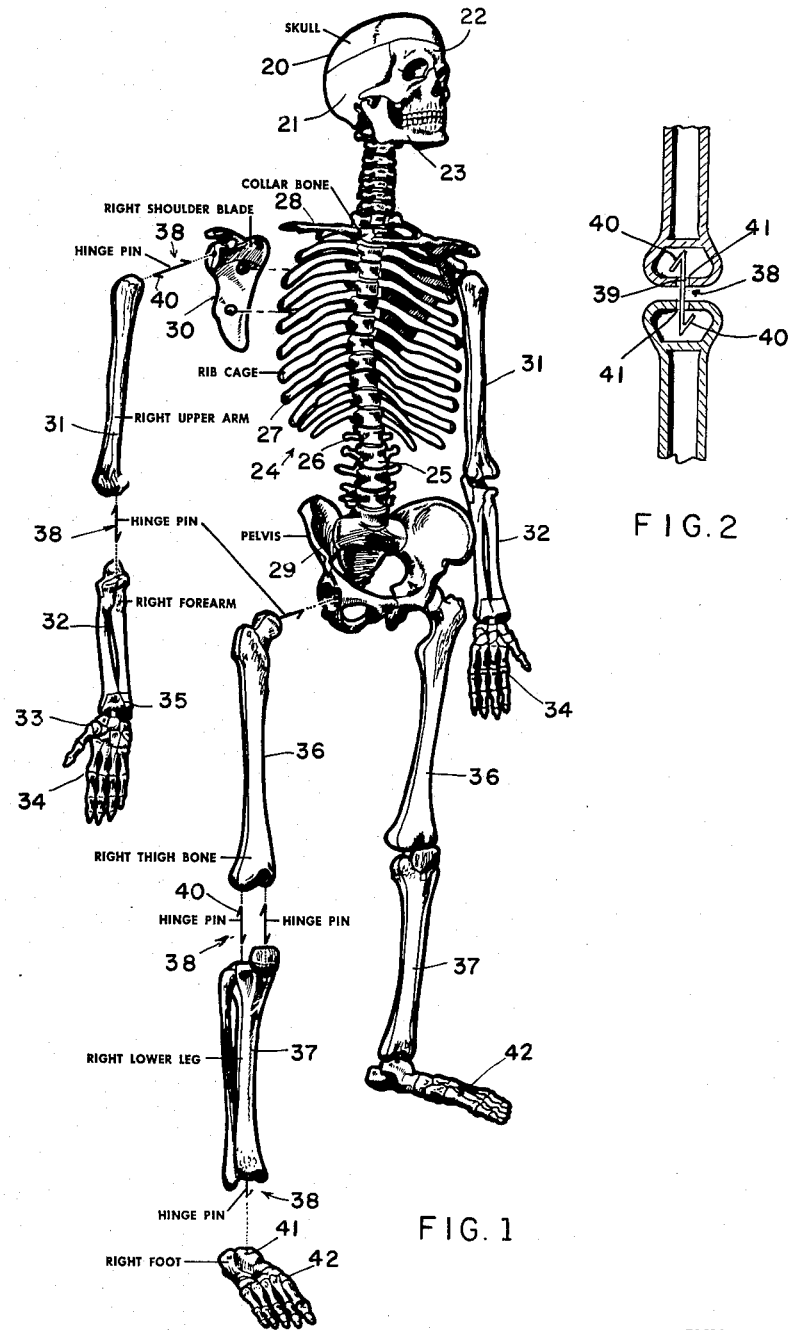

INVENTOR.
IRVING ROSENBLOOM
BY
ATTORNEY

June 20, 1961     I. ROSENBLOOM     2,988,823
TRANSPARENT ANATOMICAL MODEL
Filed Aug. 12, 1959     3 Sheets-Sheet 3
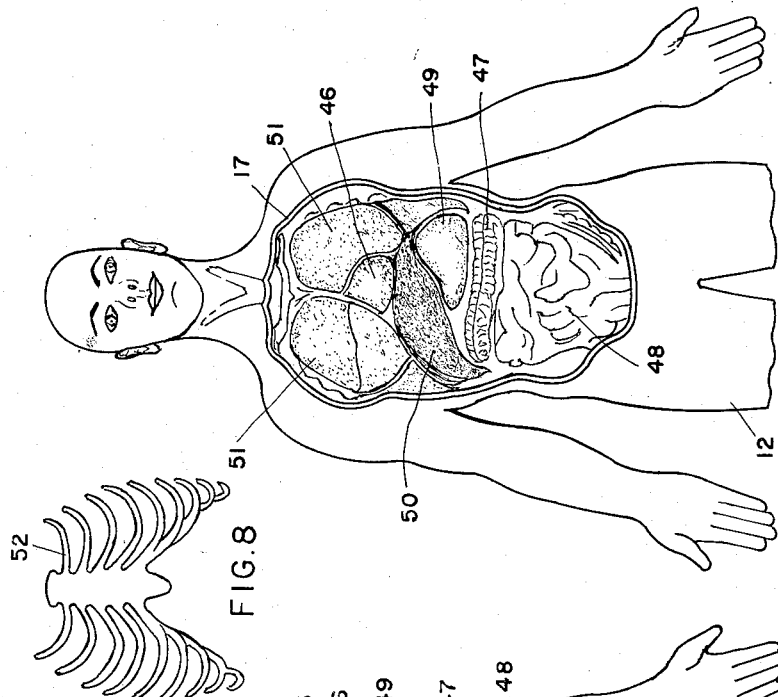
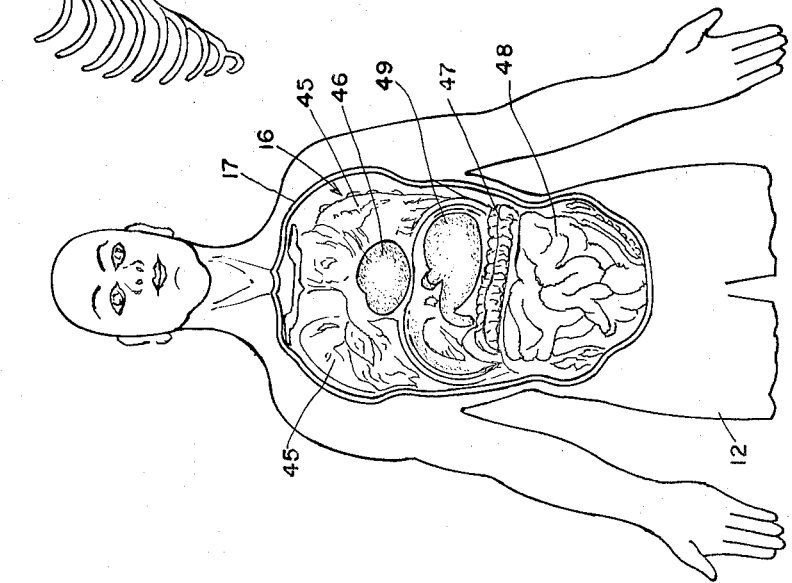
INVENTOR.
IRVING ROSENBLOOM
BY
ATTORNEY

United States Patent Office 2,988,823
Patented June 20, 1961

2,988,823
TRANSPARENT ANATOMICAL MODEL
Irving Rosenbloom, Great Neck, N.Y., assignor to Renwal Toy Corporation, Mineola, N.Y., a corporation of New York
Filed Aug. 12, 1959, Ser. No. 833,208
11 Claims. (Cl. 35—17)

This invention relates to an anatomical model; and more particularly, concerns a model of the human body including transparent outer shell sections and simulated skeleton structure and body organs disposed within the shell sections and visible therethrough.

An object of this invention is to provide an anatomical model in disassembled form, yet readily adapted to be assembled for teaching or observation purposes.

Another object of this invention is to provide a model of the human body including hollow, interengageable body sections, a skeleton structure and the several body organs receivable within the body sections; the skeleton structure being assembled from simulated bone elements; the body organs being adapted to be located in proper position relative to the body sections and the skeleton structure.

Yet another object of this invention is to provide a kit of parts made up in the form of molded plastic members simulating human body sections, human bones and organs; the bones being adapted to be assembled and articulated to each other to form a simulated skeleton structure for disposition within the body sections; one body section having a removable plate to provide an access opening for inserting the simulated organs in proper relation to the body sections and the skeleton structure.

While anatomical models have been manufactured for use in teaching medical students, nurses and the like; such models have been extremely expensive and therefore sold in limited number for class room demonstration. The cost of such models prohibits the allocation of a separate model for each student. Similarly, students at the high school level have been handicapped by the lack of inexpensive anatomical models for individual study in the biological and physiological sciences. Furthermore, with greater interest in the sciences generally, children of pre-high school age have been handicapped in their interest in studying human anatomy for school purposes or for general self interest, by lack of inexpensive, precisely simulated anatomical models.

Accordingly, still a further object of this invention is to provide an improved anatomical model wherein the several parts are produced by inexpensive plastic molding procedures; such parts including the body shell, skeleton structure and body organs are faithfully simulated in all detail; the skeleton structure being assembled from constituent bone elements in an improved manner and the body shell having a structure allowing the simulated body organs to be associated therewith and with the skeleton structure in proper relation to each.

Other objects of this invention are in part obvious and in part hereinafter pointed out.

In the drawings,

FIG. 1 is an elevational view of a skeleton structure forming a portion of the anatomical model embodying the invention;

FIG. 2 is a vertical sectional view showing the pin connector means for articulating adjacent bone elements;

FIG. 4 is a front elevational view of the model with the frontal plate portion removed, to show a number of the body organs in place;

FIG. 5 is a front elevational view similar to that shown in FIG. 4, with additional organs in place;

FIG. 8 is a front elevational view of the front portion of the rib cage.

The anatomical model embodying the invention, comprises essentially a precise simulation of the human body, in the form of front and rear shell body sections arranged for frictional interconnection; a complete set of elements adapted for assembly to form a simulated human skeleton, which skeleton is receivable within said body sections; and a complete set of simulated body organs. The front body section includes a removable plate portion to expose therein an access opening whereby the body organs may be disposed within the body sections in proper relation to said body sections and the skeleton structure.

Each of the sections, skeleton elements and body organs are formed from plastic material in precisely molded form. Simple connection means is provided for connecting and articulating the several elements to form the skeleton structure. Furthermore, the body sections are transparent to allow a clear view of the skeleton structure and body organs.

Figure 3:
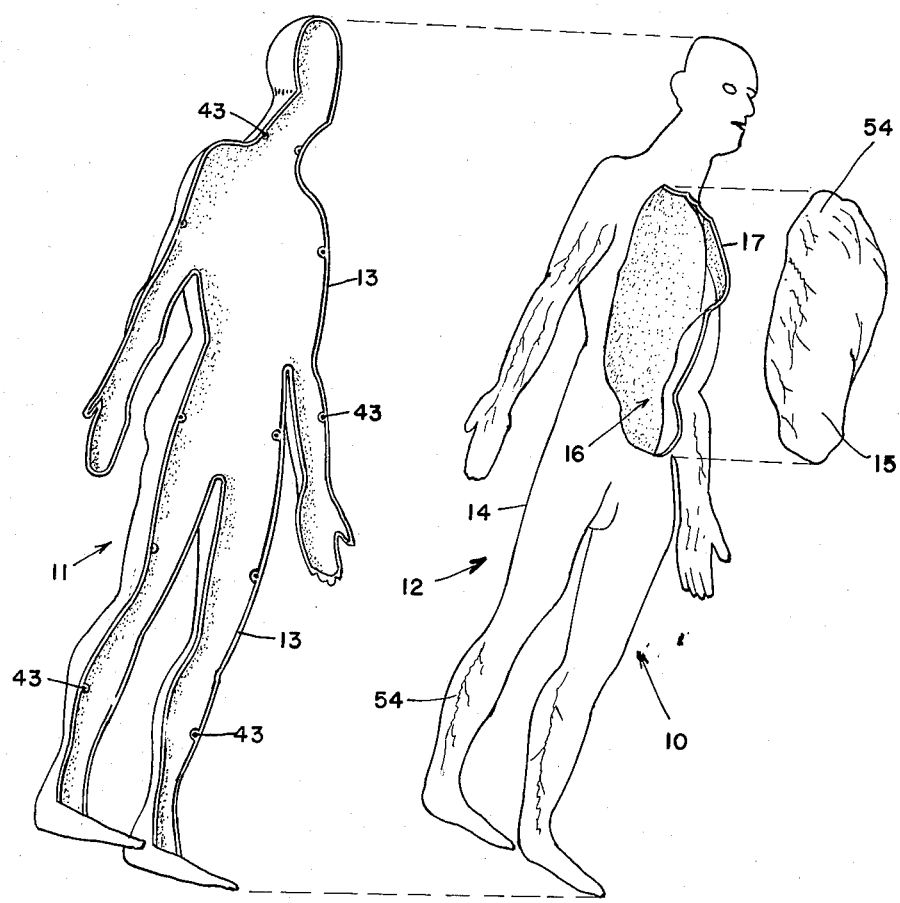
FIG. 3 is an exploded elevational view showing the several parts of the shell body portion of the model.

Thus, as shown in FIG. 3, the body of the anatomical model embodying the invention, generally designated as 10, comprises a rear body section 11, in thin walled shell form produced by molding plastic material such as cellulose acetate, vinyl copolymer, polystyrene, or the like, and a front body section 12 for mating relation with body section 11. Section 11 includes outline edge portions 13 and section 12 includes corresponding outline edge portions 14 adapted to abut edge portions 13 upon assembly of said sections. Preferably edge portions 13, 14 are located as though the body 10 were split from head to foot with successive edge portions being disposed substantially medially of the corresponding body portions.

Thus, body sections 11, 12 may be brought into mating relation to form the complete hollow body 10; the sections being held together by frictional interengaging means hereinafter described in detail. Front body section 12 includes a removable plate portion 15 which corresponds to the breast and abdominal portions of body 10; said plate portion 15 on removal from body section 12, exposing an access opening 16 extending downwardly from the shoulders to a point just above the crotch. Said opening 16 is defined by a peripheral edge 17 which is abutted by the peripheral edge 18 of plate portion 15; the plate portion 15 being held in place by suitable means hereinafter described.

In accordance with the invention, there is provided a plurality of precisely molded plastic elements which respectively simulate the skull, jawbone and various bones and bone structures of the human body. As indicated in FIGS. 2, 3; the several elements may be suitably assembled. Thus, separate skull top 20, skull base 21, facial bones 22 and jawbone 23 may be cemented or otherwise secured together. As the skull parts 20–23 form a hollow structure, simulated brain elements formed of molded plastic, not shown, are insertable into the skull cavity during assembly.

The simulated spine 24 is made up of a front section 25 and a rear section 26 which includes integrally therewith the rear portion of the rib cage 27. Sections 25, 26 are cemented together after interposing therebetween the collar bone 28 and pelvis 29 in appropriate relation to said sections 25, 26. Shoulder blades 30 are cemented in place to the rear of rib cage 27.

The several parts of each of the arms are assembled as by forming the upper arm 31 from complementary sections which are cemented together; and similarly the forearm 32 from complementary sections, also cemented together. The lower end of forearm 32 is formed with a T shaped pocket, not shown, for receiving a stud 33 on hand 34. A simulated wrist member 35 covers the stud 33 and retains the hand 34 in place; the member 35 being cemented in place.

The thigh bones 36 and lower leg 37 are similarly assembled by cementing together complementary sections. As shown in FIG. 2, connector pins 38 are provided for connecting various bone elements. Such pins 38 are formed of wire with a linear portion 39 and oppositely inclined end portions 40 at the opposite ends of portion 39. The bones to be interconnected, are formed with openings 41 in their end walls, to receive the inclined pin portions 40, thereby providing a convenient and simple form of interconnection.

Figure 6:
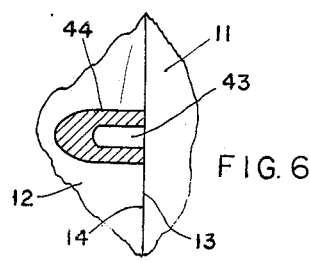
FIG. 6 is a sectional view showing the frictional means for interengaging the front and rear body shell sections of the model.

As indicated in FIG. 1, double pins 38 connect thigh bone 36 and lower leg 37. A single pin 38 connects simulated foot 42 to the lower end of lower leg 37. The skull assembly is secured to the spine 24 by a bayonet connection, not shown. The completely assembled skeleton structure is now placed within rear body section 11 and the front body section 12 is fitted in mating relation to section. As shown in FIG. 6, rear body section 11 is provided with pins 43 integral with outline edge 13 thereof and projecting outwardly thereof. Front body section 12 is formed with sockets 44 to receive pins 43, said sockets 44 being spaced along outline edge 14.

The various body organs are provided in molded plastic form for insertion through access opening 16 in front body section 12, in proper position relative to the skeleton structure. Thus, the various organs are progressively located in proper position, as indicated in FIGS. 4, 5.

The rear portions of lungs 45 are located within the rib cage 27, followed by heart 46, large intestine 47, small intestine 48 and stomach 49. Thereafter liver 50 is properly located and the front portions of lungs 51 are secured to the corresponding rear portions 45, by locating pins, not shown. Other organs, not shown, including windpipe, kidneys, pancrease, spleen, colon, bladder and the like, are similarly located in proper relation to other organs.

Figure 7:
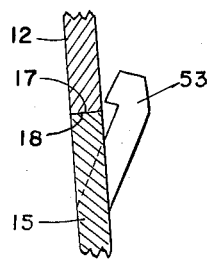
FIG. 7 is a sectional view showing the means for removably connecting the plate portion over the access opening in the front body section.

A front rib cage 52, as shown in FIG. 8, is located over the various organs and in complementary relation to back rib cage 27. The body assembly is now completed by positioning plate portion 15 over access opening 16. As shown in FIG. 7, plate portion 15 is provided with integral studs 53 projecting rearwardly from plate edge 18. A single stud 53 is disposed at the bottom of plate portion 15 and in addition, single studs are located on the opposite lateral edges of said plate portion. The bottom stud 53 on plate portion 15 is hooked over edge 17 and similarly, one of the side studs is also hooked over said edge 17. Pressure applied to the edge portion of plate 15 over the third stud will snap the same down under edge 17.

It will be apparent that the completed model readily reveals through the transparent wall portions thereof, both skeleton structure and various body organs. The plate portion 15 may be removed from access opening 16 by pressing upwardly to disengage lower stud 53, facilitating the disengagement of the other studs and removal of the plate portion.

To enhance the utility of the anatomical model, the veins and arteries may be simulated by molding replicas thereof on the rear surface portions of body sections 11, 12, as at 54. The student may then paint such representations in appropriate colors to distinguish arteries from veins.

It will be apparent that the anatomical model embodying the instant invention lends itself to detailed instructive manipulation with the progressive assembly of the skeleton structure and the location of the body organs in proper place. Thus, in connection with formal teaching of biology, physiology, anatomy, and the like, as well as in the self-teaching of these sciences, the pupil may be provided with an inexpensive model which is an important adjunct to lectures and text material in the subjects.

As various changes might be made in the embodiment of the invention herein disclosed without departing from the spirit thereof, it is understood that all matter herein shown or disclosed is illustrative and not limiting except as set forth in the appended claims.

Having thus disclosed my invention, I claim as new and desire to protect by Letters Patent:

1. A human anatomical model comprising separable front and rear hollow, shell body sections, said sections having mating edges disposed in a common plane extending vertically of said model, interengaging means on the mating edges of said body sections for holding said body sections together, a simulated, molded plastic skeleton structure removably disposed within said body sections, the torso portion of said front body section including a removable plate portion to provide an access opening to the interior of said model, and simulated, molded plastic body organs insertable through said access opening for disposition in proper relation to said skeleton structure and said body sections, said body sections being formed of molded transparent plastic material to render visible therethrough said skeleton structure and body organs.

2. A model as in claim 1, wherein said skeleton structure comprises bone elements, and pin means for interconnecting associated bone elements.

3. A model as in claim 2, wherein said bone elements are formed with recesses to receive end portions of said pin means, said pin means comprising a linear portion and hooked portions at the opposite ends of said linear portion, said hooked portions being engaged in the recesses of said bone elements.

4. A model as in claim 1 wherein the interengaging means on said body sections comprise socket portions and pin portions frictionally receivable in said socket portions.

5. A model as in claim 1 wherein said plate portion includes a plurality of studs projecting outwardly of the edges of said plate at spaced points therein, said studs being receivable rearwardly of the edge of the access opening in said front body section to retain said plate portion in said access opening.

6. A human anatomical model comprising mating hollow front and rear shell body sections, interengageable means at spaced points along the mating edges of said body sections for frictionally holding said sections together, a simulated skeleton structure comprising elements simulating the respective bone elements of the human skeleton, said elements being formed of molded plastic, means for interconnecting said plastic elements, said simulated skeleton structure being disposed interiorly of said body sections, said front body section including a plate portion simulating the human breast and abdomen, said plate portion having a peripheral edge mating with a peripheral edge defining an access opening in said front body section, stud means projecting from the edge of said plate portion for engaging inner marginal portions of said front body section at the access opening therein for removably connecting said plate portion to said front body section, a plurality of molded plastic elements simulating the respective body organs insertable through said access opening for proper disposition between said front and rear body sections and in proper relation to said skeleton structure, said body sections and plate portion being formed of transparent plastic material.

7. A model as in claim 6, wherein raised lines are molded on the interior surface portions of said body sections and plate portion to simulate human veins and arteries visible through the outer surface portions thereof.

8. A model as in claim 6 wherein the mating edges of said body sections are located in substantially medial portions of the several adjacent vertically disposed parts of said model.

9. A model as in claim 6 wherein said access opening in the front body section extends downwardly from the shoulder portion thereof to a point slightly above the crotch portion thereof.

10. An anatomical model comprising a body simulating portion, a simulated skeleton structure and simulated organs, said body simulating portion comprising a pair of molded transparent plastic shell form sections having mating edge portions extending along a line vertically of said model, said skeleton structure being disposed between said body sections, means for holding said body sections in assembled relation, one of said body sections including a removable plate portion to provide an access opening communicating with the interior of said assembled body portions for inserting therethrough said organs into proper locations relative to said body sections and said skeleton structure, and means for holding said plate portion in assembled relation to said one body section.

11. An anatomical model formed of molded transparent plastic material, said model comprising a pair of walled body sections having mating edges, means for separably connecting said body sections, a preassembled simulated skeleton structure disposed between said body sections, one of said body sections being formed with an access opening, a plurality of simulated organs, said organs being respectively insertable through said access opening for proper location relative to said body sections and said skeleton structure, and a transparent plate portion for closing said access opening.

References Cited in the file of this patent

UNITED STATES PATENTS

| | | |
|---|---|---|
| 411,816 | Lee | Oct. 1, 1889 |
| 2,472,819 | Giesen | June 14, 1949 |
| 2,483,034 | Braeg | Sept. 27, 1949 |
| 2,551,560 | Graves | May 1, 1951 |
| 2,611,998 | Senior et al. | Sept. 30, 1952 |
| 2,763,070 | McCormick | Sept. 18, 1956 |
| 2,971,271 | Goldenthal | Feb. 14, 1961 |
| 2,971,272 | Barlow | Feb. 14, 1961 |

OTHER REFERENCES

"Juno" Pamphlet, Deac Martin of Cleveland Health Museum (21 pages, including covers).

"British Plastics" periodical, December 1949 issue, pages 634–639. Article: Plastics Aid in Medical Teaching.